March 31, 1942.  C. H. HEAGLE  2,277,974
HEATING DEVICE
Filed Aug. 12, 1939  3 Sheets-Sheet 1

INVENTOR.
Collin H. Heagle
BY: Cox & Moore
ATTORNEYS

March 31, 1942. C. H. HEAGLE 2,277,974
HEATING DEVICE
Filed Aug. 12, 1939 3 Sheets-Sheet 2

INVENTOR.
Collin H. Heagle
BY Cox & Moore
ATTORNEYS.

March 31, 1942.  C. H. HEAGLE  2,277,974
HEATING DEVICE
Filed Aug. 12, 1939    3 Sheets-Sheet 3
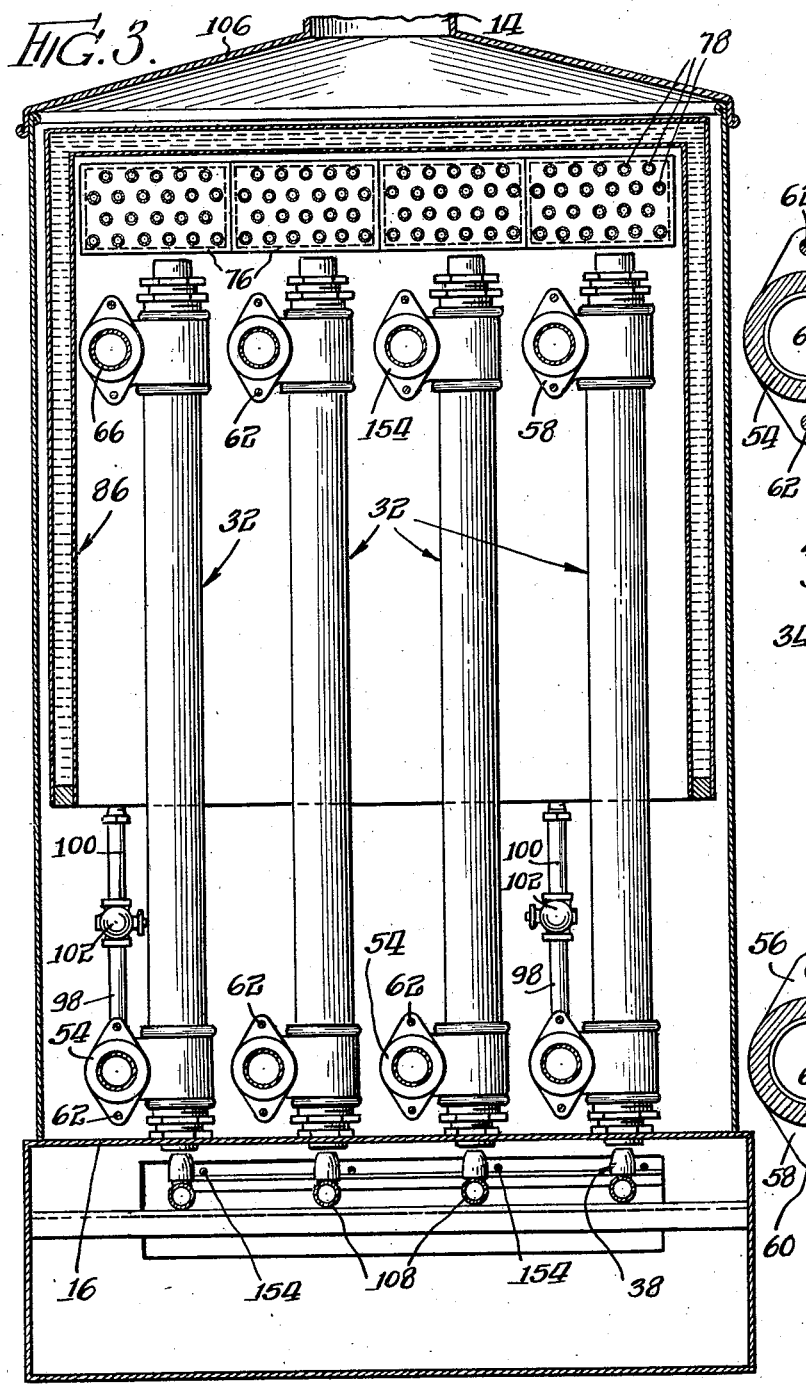
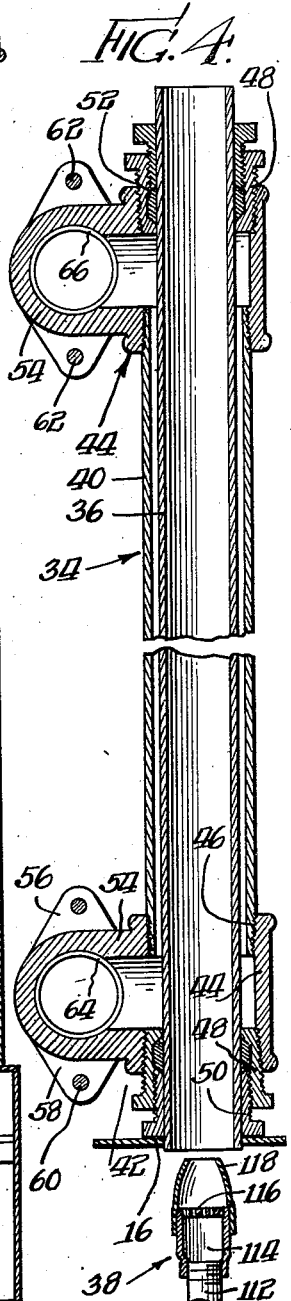
Collin H. Heagle
BY Cox & Moore
ATTORNEYS Patented Mar. 31, 1942

2,277,974

UNITED STATES PATENT OFFICE 2,277,974

HEATING DEVICE

Collin H. Heagle, St. Louis, Mo., assignor to Ernest J. Svenson, Rockford, Ill.

Application August 12, 1939, Serial No. 289,796

1 Claim. (Cl. 122—174)

The present invention relates to a heating system and, in particular, to a heating and boiler unit for use in absorbing heat of combustion in a suitable fluid.

The present invention contemplates the provision of an improved heating unit or boiler adapted to abstract heat of a flame or a burning fuel by absorption in a flow of water wherein the heat abstraction by the liquid is highly efficient and is carried out in a conveniently small space. In burners or heaters of the instant character it is known that heat losses occur mainly to the stack and, while it is theoretically possible to abstract substantially all of the heat from combustion gases, nevertheless it has been impractical, if not impossible, to absorb this heat in usable form without the provision of unduly complex and bulky means. It is, therefore, an important object of the present invention to provide means for transferring the initial heat of combustion as from a flame by passing the products of said flame, for example, adjacent a relatively attenuated flow of boiler water, in heat transferring relationship, the heat being rapidly abstracted, and rapidly bringing the flow of water to a predetermined elevated temperature, the gases subsequently being caused to flow in heat exchanging counter-current to a second, relatively cool flow of water arranged in jacketing relationship about the first transfer means.

A further important object of the present invention is to provide a heating unit or furnace of the foregoing general character wherein the initial heating unit comprises upstanding tubular members for conveying the products of combustion and the liquid in heat exchange relationship and wherein the unit is enclosed in the aforesaid water jacket in such a manner that the gases of combustion are directed downwardly thereabout to heat the tubular members both externally and internally.

Yet, more particularly, the present invention contemplates a construction as above such that flames pass interiorly of tubular boiler fluid conduits and are projected upwardly to heat the fluid in its upward flow while being subsequently directed downwardly to supply the residual heat about the exterior of the tubular members as well as separate flow in the jacketed member which promotes the downward movement of the combustion gases. Accordingly it will be seen that the present invention, while providing for progressive and rapid heating of the main flow of boiler water by passage of the combustion products and the water stream in the same direction, nevertheless provides for the ultimate absorption of the residual energy from the gases by re-circulation adjacent the tubes and in counter-current relationship with the exterior surfaces thereof. In other words, combustion products, while in heat transfer relationship with a boiler fluid, move first with the said flow of fluid and then counter-current thereto for progressively heating the fluid to a maximum temperature while, at the same time, utilizing the residual heat for augmenting the initial warming of the same flow as it moves in the lower portions of the tube. A further important object of the present invention is to provide a construction capable of operating as above wherein the flow of fuel gases is directly controlled by the outer jacket in such a manner as to promote further absorption of energy in the jacket after the fuel gases have moved from the vicinity of the tubular members.

In accordance with the present invention there is yet additionally provided a construction such as the foregoing where the so-called main or initial flow of boiler fluid which passes in heat exchange relationship to the initial products of combustion is so formed and constructed as to contain a relatively minor portion of the total boiler fluid while providing for a relatively high volume flow, the jacket portion providing a relatively restricted flow and comprising the main reservoir of boiler fluid.

Yet further objects and advantages of the present invention will be apparent from the following description when taken in connection with the accompanying drawings wherein:

Figure 3 is a sectional view taken through the same unit in a transverse direction and more specifically on the line 3—3 of Fig. 2.

Figure 4 is a detailed sectional view taken through one of the upstanding tubular heating units on the line 4—4 in Fig. 2.

Figure 1:
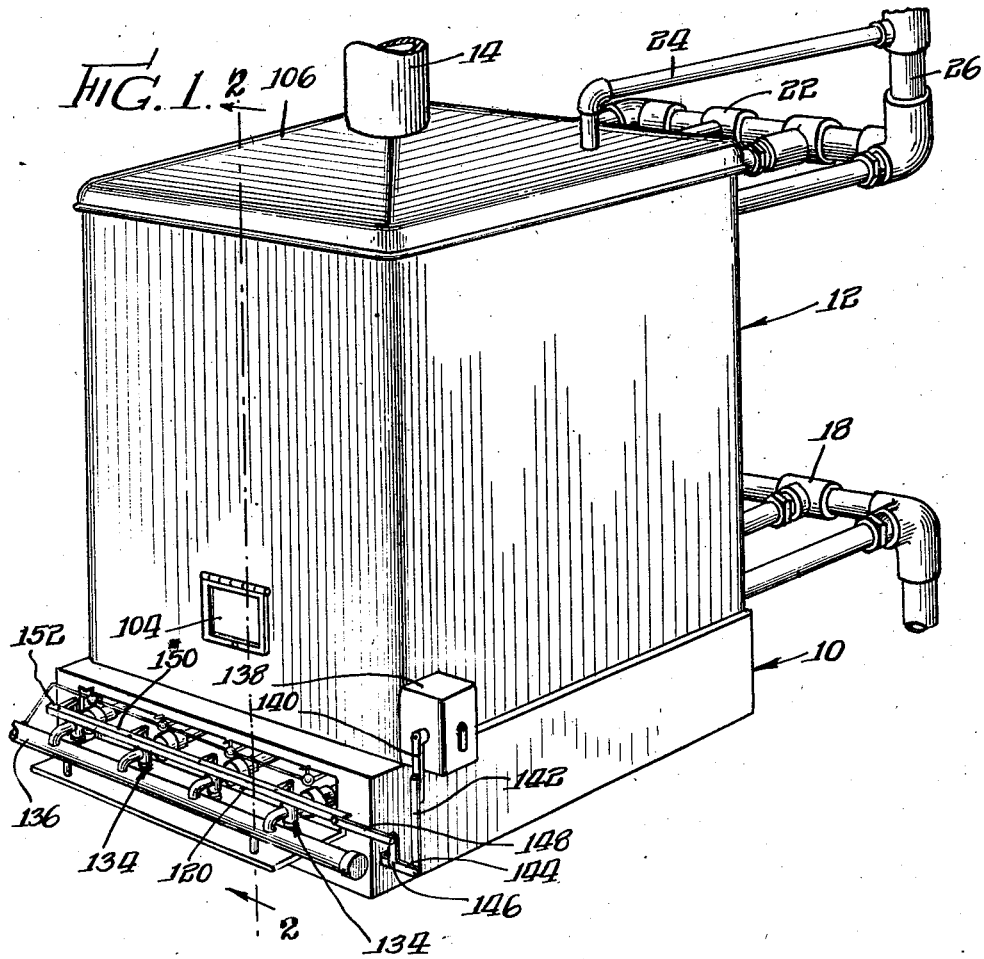
Figure 1 is a perspective view of a heat transfer furnace constructed in accordance with the present invention.

Referring to the drawings wherein one illustrative embodiment of the present invention is disclosed more in detail, Fig. 1 shows a heating unit or boiler having a lower base or fuel dispensing portion 10 and an upper boiler or heat transfer housing 12. It will be evident that the combustible fuel is introduced into the lower housing 10 for passing through the boiler housing 12 and is exhausted through a flue 14.

The lower housing 10 accommodates a burner mechanism, to be hereinafter described more in detail, while the upper housing 12 which is separated therefrom by a partition wall 16 receives the products of combustion and contains interiorly, structure adapted to transfer the heat of combustion to a suitable boiler fluid. The boiler fluid is supplied for heating to a header 18 from any suitable source such as, for example, from a domestic heating system. The heated boiler fluid is supplied at a header 22 in line 24 for supply to the system.

Figure 2:
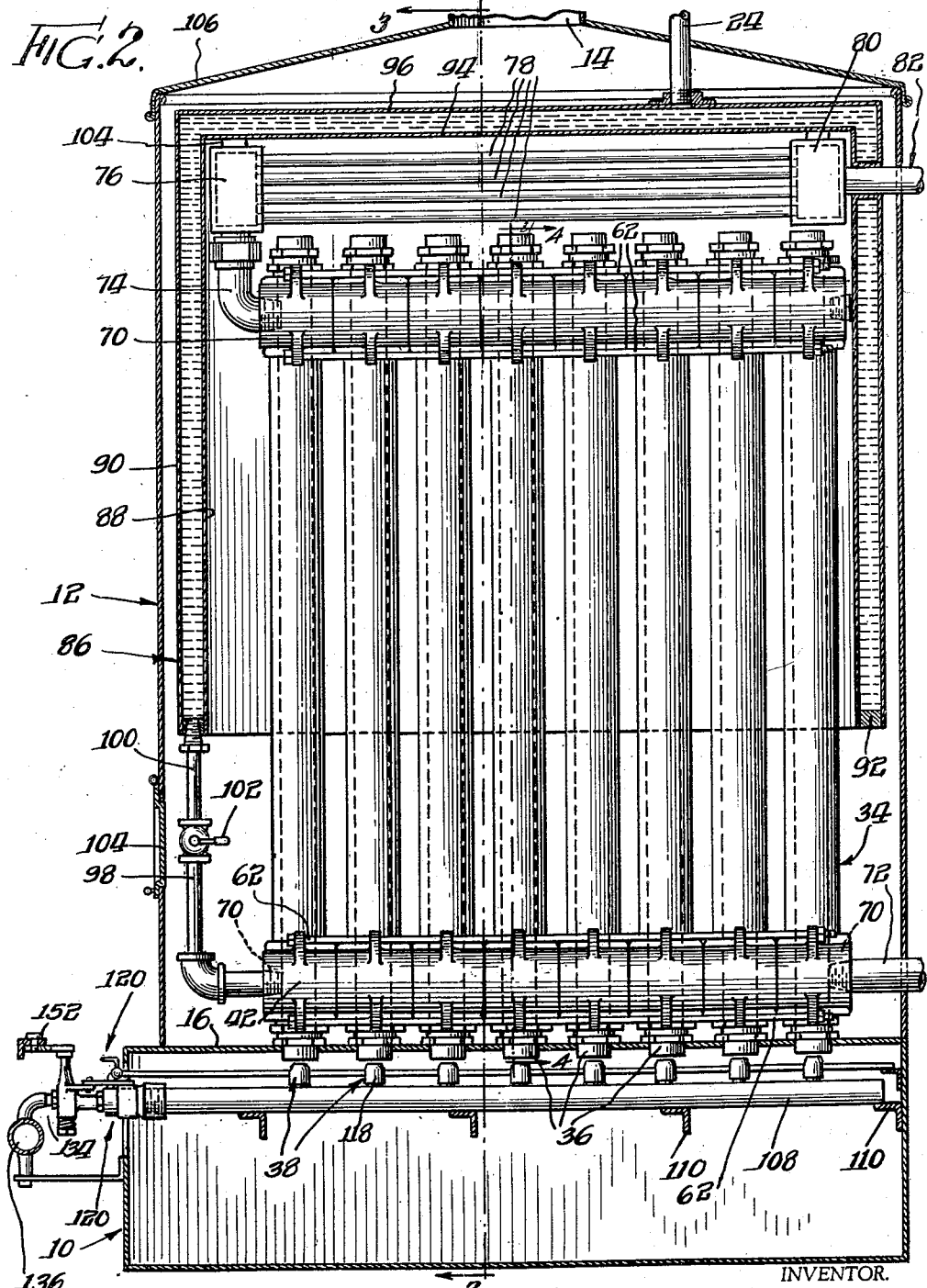
Figure 2 is a sectional view taken centrally through Fig. 1 on the line 2—2 thereof.

The most important aspect of the present invention more particularly concerns the heat transfer structure comprised within the housing 12 and shown more in detail in Figures 2, 3 and 4. In the illustrated embodiment the heat of combustion is initially abstracted from the combustion products in a series of four upwardly extending groups of tubular heat transfer members illustrated by the reference number 32. Each of the groups comprises individual tubular units or sections 34, and each section or unit being adapted to co-act with and receive the flame from an individual burner as will hereinafter more fully appear. Each of the sections comprises a central tube 36 arranged vertically and having its lower open extremity extending through the partition wall 16 which divides the burner chamber from the boiler chamber. As clearly shown, a burner jet 38 arranged thereunderneath supplies its combustion products directly upwardly through the tube 36 which acts as a flue. A second concentrically arranged larger tube 40 embraces the tube 36 providing an annular water way or space for boiler fluid. The relative arrangement of the two tubes 36 and 40 is maintained by fittings or castings 42 shown in Figures 2 to 4 and comprising a cylindrical vertically extending body 44 interiorly threaded at either vertical end as at 46. Thus the upper threaded portion 46 of the lower fitting 44 in Figure 5 receives the lower extremity of the pipe section 40, while the upper fitting 44 receives the upper end of the pipe, being arranged in inverted relationship. The opposite internally threaded portions on the respective fittings 44 receive annular plugs 48 which, in turn, accommodate adjustable packing members 50. By the expedient of threadedly adjusting the position of the annular packing member or gland 50 in the plug 48, a central member 52 is gripped against the inner tube 36 adjacent the upper and lower extremities, thus hermetically sealing the space between the tubes 36 and 40.

It should be particularly noted that the fittings 44 have laterally extending integral portions or conduits 54 projecting to the left, and terminating in a passageway or conduit projecting axially in a direction normal to the plane of the figure. Each of the laterally extending formations or passageways 54 is provided centrally with upstanding flanges 56 and 58 apertured near their extremities as at 60. The purpose of this flange construction is to permit the series of tubular assemblies and units to be hermetically joined together as a unit. Thus, in accordance with the illustrated embodiment of the figures, eight tubular sections 34 are assembled as a unit in parallel upstanding relationship through the agency of tie bars 62. Hermetical sealing of the junctures between the respective conduit portions 54 is effected by means of push nipples 64.

It is important to note that the end-most fitting of each set or section of vertical tubes is closed by an end wall 70. Into the lower rearmost wall 70, as viewed in Fig. 3, is fitted pipe 72 of the intake header 18. Outlet is effected by means of an elongated fitting 74 into the header provided by the upper fittings at the left hand end thereof, as viewed in Fig. 3. Elongated fitting 74 leads into a distribution box or header 76, which distribution box supplies a series of relatively small water tubes 78 forming the final heat transfer means or "super heater." The tubes 78 in turn empty into an outlet box or header 82 which communicates by means of an outlet pipe 82 with the hot water header 22. As indicated more clearly in Fig. 4, there are a pair of headers 76 and 80 corresponding to and above each of the tubular sections or units, each having a multiplicity of water tubes 78 arranged in staggered relationship in the path of the combustion gases emanating from the tubes 36. It will be evident from the foregoing that each of the boxes 76 is supplied by an individual elongated fitting from its respective bank or section.

From the foregoing it will be apparent that the water entering the inlet tube 76 passes into the respective lower fittings and through the annular space between the tubes 36 and 40 in a relatively thin or attenuated film or layer, receiving heat meanwhile from the flame within the tube 36. The water collected within the upper fittings 42 passes axially thereof and through the elongated fitting 74 and the distribution boxes 76, through the tubes 78 exposed directly to the hot combustion gases flowing transversely thereof. Throughout this path, therefore, the water is continuously elevated in temperature and received by the outlet tube 84 at its final elevated temperature.

In order to further improve the efficiency of the present device, the invention contemplates the provision of an enclosing water jacket indicated in general by the reference numeral 86. The water jacket comprises inner and outer upstanding walls 88 and 90 respectively, spaced relatively closely from each other and from the adjacent side walls of the rectangular housing 12. The walls 88 and 90 are sealed together at the bottom by means of a bottom closure wall 92. Inner and outer top walls 94 and 96 respectively, provide an upper jacket in communication with the side jackets. It will be obvious, therefore, that the jacket construction provides a hood or cover which completely encloses and seals the upper part of the inner assembly hereinbefore described, the side portions of the jacket extending downwardly to form a skirt or baffle which projects almost to the bottom portions of the tubes 34. It follows, therefore, that the heated gases from the tubes 36 passing through the tubes 78 and impinging upon the lower wall 94 of the upper surface of the jacket are deflected downwardly and caused to flow in a downward draft by the skirt portions. As a result, these gases bathe the outer walls of the pipes 40 and move downwardly in counter-current relationship to the upward flow of water. In the meanwhile, the outer jacket or hood surface absorbs the residual heat. In general it may be stated that the gases in passing downwardly from their point of impingement with the upper part of the jacket gradually cool as they pass along the downwardly extending skirt or leg portions in what may be termed counter-current relation. It is to be noted that water for the jacket 86 is supplied from the lower header by means of a pipe or pipes 98 which communicate with the lowermost forward fittings 42 and exhaust into the jacket through the lower wall 92 at the fittings 100. The outlet pipe 24 projects into the upper horizontal leg in the water jacket 86 adjacent its central portion, as shown in Figure 3. While only one water jacket inlet pipe 98 appears in Figure 3, such a pipe may, and preferably does, emanate from each of the banks or sections of the tubular transfer construction. It has been found, moreover, that approved results are obtained if the pipes 98 are distributed and exhaust fairly uniformly into the jacket about the lower periphery thereof. That is to say, the flow of water through the jacket is therefore rendered quite desirably uniform. Each pipe 98 is provided with a cut-off valve 102. The jacket is supported upon blocks 104 upon the distribution boxes 76 and 80. Additional supports not shown in detail may be included and are desired in order to additionally rigidify the construction.

The outer casing or housing 12 is provided with a clean-out door 104 in its front wall and has a top wall 106 removable for access to the interior. The top wall 106 has the form of a cover with downwardly projecting side walls or lips embracing the upper extremities of the rectangular side walls forming the housing. Exhaust flue 14 is let into the central part of the upper wall 106, as shown in Figures 1 and 3.

Heat of combustion supplied to the transfer device originates at the burners 38 in the lower burner housing 10 which has an open front face and supports four laterally extending burner pipes 108 which rest upon brackets 110. Each of the burners comprises a short stub tube or nipple 112 threaded laterally into the burner pipe 108 and provided with an expanded fitting 114. The fitting 114 is provided with a regularly apertured wall 116 at its upper end and is embraced by a thimble shaped shield or jet 118. When the burner is in operation the gaseous combustible mixture passes upwardly through the apertured plate 116 and burns in the air just above the jet 118, the conical curvature of the jet serving to direct the flame into the superposed tube 36. The fuel supply control is effected through the agency of a control box 138 of any conventional construction and operated preferably from a thermostatic control. The control box or unit is of the type provided with a rotatable arm 140 which, in response to the thermostat, may assume either of two angular positions. Connected to the free end of the arm 140 is a linkage comprising, in order, an arm 142, a bell crank 144 movable about a fixed pivot at 146 and a link 148 movable by the bell crank. It will be obvious from the foregoing that the link 148 serves to control the longitudinal position of an angle bar 150 which angle bar has pivoted connection as at 152 with a handle arm or lever on each of the valves 134. Accordingly, with the arm 140 in the position shown, the respective valves 134 are in open position. When the thermostat initiates the supply of additional radiation the arm 140 will move to an upper rotational position, through the associated linkage, forcing the angle bar 150 to the left, as viewed in Figure 6, and rotating the valves to a throttled position wherein the flames are substantially lowered.

Assuming the initiation of "high" burner flames above the burners 38, the operation of the boiler is as follows: The combustion products pass upwardly through the pipes 36, meanwhile rapidly transferring their heat energy to the relatively thin layer of water surrounding the tube 36. The water meanwhile flows upwardly in the same direction as the flame and passes from the annular chamber out through the header provided by the alined projections 54 on the upper fittings 44. The heated flow of water thus moves through the elongated fitting 74, the combustion boxes 76 and the water tubes 78 which are subject to further intense heating by the draft of combustion gases emanating from the upper extremities of the tubes 36. Passing through the nests of tubes 78 the hot gases impinge directly against the upper or horizontal leg of the water jacket 12 by which time they are considerably cooled. Upon flowing downwardly within the hood or skirt formed by the water jacket these gases flow about the outer tubes 40 of the tubular heating units 34. It is extremely important to note that in passing downwardly these relatively cooled gases pass not only along the same flow of water adjacent which they flowed in relatively hot condition, but at the same time, move with respect to the flow of water in a counter-current direction. That is to say, during the initial and rapid transfer of heat the flame gases move with the flow of water whereas during the ultimate and final extraction of heat the same gas is moved in a counter-current direction and toward a point where the relatively cool water enters the tubular units. As a result, the water in the annular tubular spaces is heated not merely from the inside, but from the outer sides as well. While the internal heating proceeds with maximum intensity, due to the adjacency of the hot flame, the outer heating, being counter-current in nature, contributes to the higher efficiency of operation of the present device. Viewed in another aspect, it will be seen that if the internal heating of the tubular units were relied upon entirely, the relatively cool water entering the bottom of the annular spaces would progress upwardly a substantial distance before any appreciable heat would be transferred completely through to the outer surfaces of the outer tube. In permitting the abstraction of a substantial portion of the residual heat from the gases as they move downwardly over the surfaces of the tube 40 the present structure contributes to increased heating efficiency.

The reservoir gases then pass around the foot or skirt portion of the jacket 86 and up through the narrow space between the outer walls 90 of the jacket and the walls of the housing 12. Since the water in the jacket is relatively cool, especially at the lower edges thereof, it will be apparent that substantially all the residual heat of the gases is finally abstracted, particularly in view of the fact that passing through the extremely narrow space the gases are in constant contact with the jacket over a substantially vertical extent.

It is of great importance to note that the jacket, particularly the downwardly extending skirt portion thereof operates at relatively lower temperature than the water heated by the tubular flues for several reasons. First of all, the water in the jacket is at no place, with the exception of the upper central portion thereof, subjected to contact by products of combustion, having a temperature approaching the temperatures existing within and just above the fire tubes 36. While the upper central part of the jacket is subjected to the residual heat in the gases coming directly from the flues 36, nevertheless it must be remembered that the flow is upwardly in the jacket which is supplied with relatively cool water at its lower extremities from the pipes 98. Accordingly the skirts of the jacket 86 having a relatively low temperature, extract the residual heat from the gases before they pass into the flue. As a result of this construction it will be evident that the flue gases may possess a temperature lower than the temperature at which the boiler or heating unit supplies hot water to the system, promoting high efficiency of heat absorption.

The secondary water flow in the pipe 24 may normally, therefore, during operation, possess a temperature substantially lower than the water supplied to the header 22 from the primary heating unit comprising the tubular units 34 and the water tubes 78. The admixture of the secondary flow with the primary flow does not, however, produce a flow having a temperature substantially lower than the temperature of the primary flow for the reason that the secondary flow is relatively much slower than that of the primary flow. Also, due to the fact that the secondary flow is relatively much slower, the water supplied through the outlet pipe 24 has a temperature which is relatively higher with respect to the temperature of the heating fluid by which it is heated than does the primary flow.

From the foregoing it will be apparent that the present invention provides a heat absorbing or transferring unit which is extremely efficient in operation and capable of transforming substantially all of the heat of combustion into a useable form. The present device, moreover, is compact and provides an adequate heat absorbing service in a relatively small compass so that only a minimum of heat is lost through radiation from the unit itself.

It is to be specifically noted that while the present device has been more specifically disclosed as operating from a source of gas, that, nevertheless, the boiler per se is useable in connection with any equivalent fuels. Thus, for example, I may substitute as an equivalent source of fuel, any equivalent hydro-carbon fuels such as oil, kerosene or natural gas, or may, if desired, employ solid fuels such as, for example, powdered fuels which may be consumed within the housing 10 and directed as a flame into the tubes 36.

It is furthermore important to point out that one or more of the jacketed walls might be omitted, suitably completing the hood by means of insulation or the like.

In such instances it will be understood from the foregoing that it is important to provide water inlet pipes 98 to each of the side jackets for a uniform distribution and flow of the water in the jackets.

The present invention is of great importance not only in improving upon the efficiency of known constructions but also in obviating numerous difficulties inherent in the operation of fuel burners of the present type. Thus the presence of excessive condensate in the flues is eliminated and minimized by virtue of the fact that the flues are supplied with relatively cool exhaust gases which in this form are not prone to attack or damage the flue surfaces. Where excessive condensate is present in the combustion gases this may be removed in part against the cool portions of the outer jacket.

It is thought that the invention and numerous of its attendant advantages will be understood from the foregoing description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

The invention is hereby claimed as follows:

In a heat transfer unit of the class described for transferring heat of combustion to a boiler fluid, a plurality of vertically extending flues for the passage of heating fluid, upstanding tubular jacket means about each of said flues for accommodating boiler fluid, means for passing a flow of heating fluid upwardly in said flues in heat exchange relation to the jackets, means for passing a primary flow of boiler fluid upwardly in said jackets, a plurality of conduit means extending horizontally over the upper ends of said flues in the path of the heating fluid leaving the upper ends of said flues, means conducting the heated primary flow of boiler fluid from said jackets to said conduit means, jacketed hood means extending horizontally over the outlet extremities of said flue means and over said conduit means, said jacketed hood means also including a vertically extending jacketed skirt portion extending downwardly about said plurality of jacketed flues and directing heating fluid from the outlets of said flues downwardly about the exteriors of said jacketed flues, means for directing said heating fluid from the lower portion of the exteriors of said jacketed flues upwardly about the exterior of said jacketed hood means and thence to a discharge flue, means for passing a secondary flow of boiler fluid upwardly in the vertical portion of said jacketed hood and across the horizontal portion thereof at a relatively slow rate of flow as compared with said primary flow, and means for joining said flows after heating.

COLLIN H. HEAGLE.